Nov. 8, 1927. 1,648,541
J. B. CHOCKLEY
TURBINE PUMP
Filed Dec. 21, 1926  2 Sheets-Sheet 1
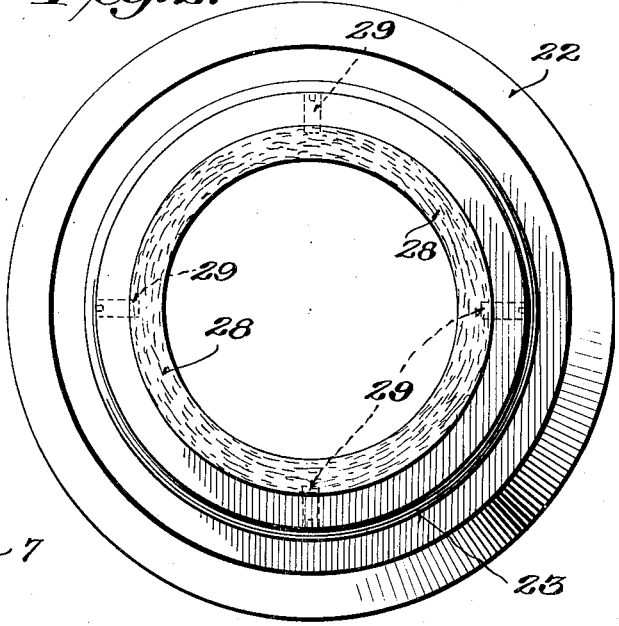
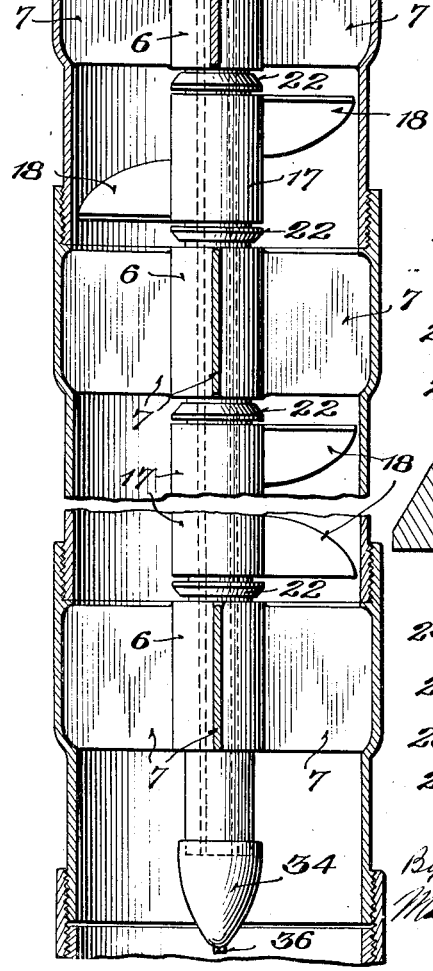
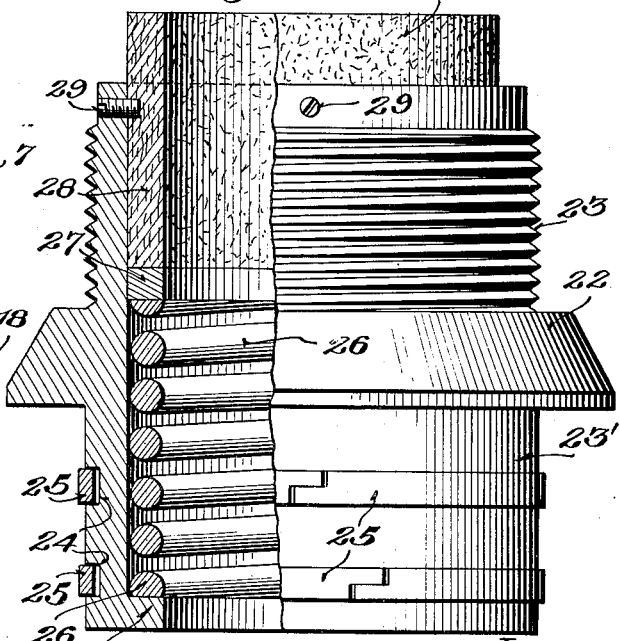
INVENTOR
Julian B. Chockley
By Mauro, Cameron, Lewis & Kirkam
Attorneys Nov. 8, 1927.

J. B. CHOCKLEY

TURBINE PUMP

Filed Dec. 21, 1926

Inventor
Julien B. Chockley
By
Mauro, Cameron, Lewis & Zerkam.
Attorneys

Patented Nov. 8, 1927.

1,648,541

UNITED STATES PATENT OFFICE.

JULIEN B. CHOCKLEY, OF MESA, ARIZONA

TURBINE PUMP.

Application filed December 21, 1926. Serial No. 156,191.

This invention relates to turbine pumps and has for its object to provide a pump of this type that shall be free from vibration and of increased efficiency coupled with a reduced consumption of power and maintenance cost.

Pumps of this type are usually installed in deep wells and are required to deliver a large volume of water therefrom. Heretofore the construction of such pumps and the method of lubrication have been such that the pump is subject to extreme vibration and soon decreases in efficiency by reason of the exposure of the shaft to the water, sand and other extraneous material which act to rapidly deteriorate the bearings, while at the same time the lubricant employed was inefficiently applied, and by reason of the fact that such lubricant was not confined to the bearing, escaped therefrom. This resulted not only in the rapid wearing and deterioration of the shaft and the bearings and injurious vibration, but in an uneconomical use of lubricant.

The object of the present invention is to remedy these defects and generally to produce a pump which can remain in position for a long period of time without removal from the well for replacement and repairs, and which shall be efficiently lubricated with the minimum amount of lubricant and practically free from vibration.

With these objects and others in view, the invention consists, broadly stated, in a turbine pump, one section of the shaft of which is hollow, which shaft has bearings carried in the usual or any suitable bearing support within the well casing, combined with means for delivering from the surface a heavy lubricant to the interior of the hollow shaft section from which it is delivered by suitable ports to the shaft bearings. The impellers, in the form of turbines, are mounted upon and revolved by said hollow shaft section between the several sets of bearings, and each impeller hub, both above and below the same, is provided with means for effectively confining the lubricant to the bearing. Means are also provided for protecting the shaft between the bearing and the hub of the impeller from contact with water in the well, to the end that the entire hollow shaft section is enclosed within the bearings, the impeller hubs and the means above described between the hubs and bearings. Means are also provided for lubricating the lower end of said shaft section and to prevent the escape of lubricant from the shaft other than to the bearings, to the end that the most economical use of such lubricant may be obtained.

The inventive idea is capable of receiving a variety of mechanical expressions, one of which, for the purpose of illustrating the invention, is shown in the drawings, but it is to be expressly understood that such drawings are for illustration purposes only and are not designed to define the limits of the invention, reference being had to the appended claims for this purpose.

In said drawings—

Fig. 1 is a view partly in section and partly in elevation of a pump embodying the invention;

Fig. 2 is an enlarged plan view of a nut and spring pressed felt washer employed to retain the lubricant in the bearings and protect the shaft;

Fig. 3 is a side elevation, partly in section, of Fig. 2;

Figure 4:
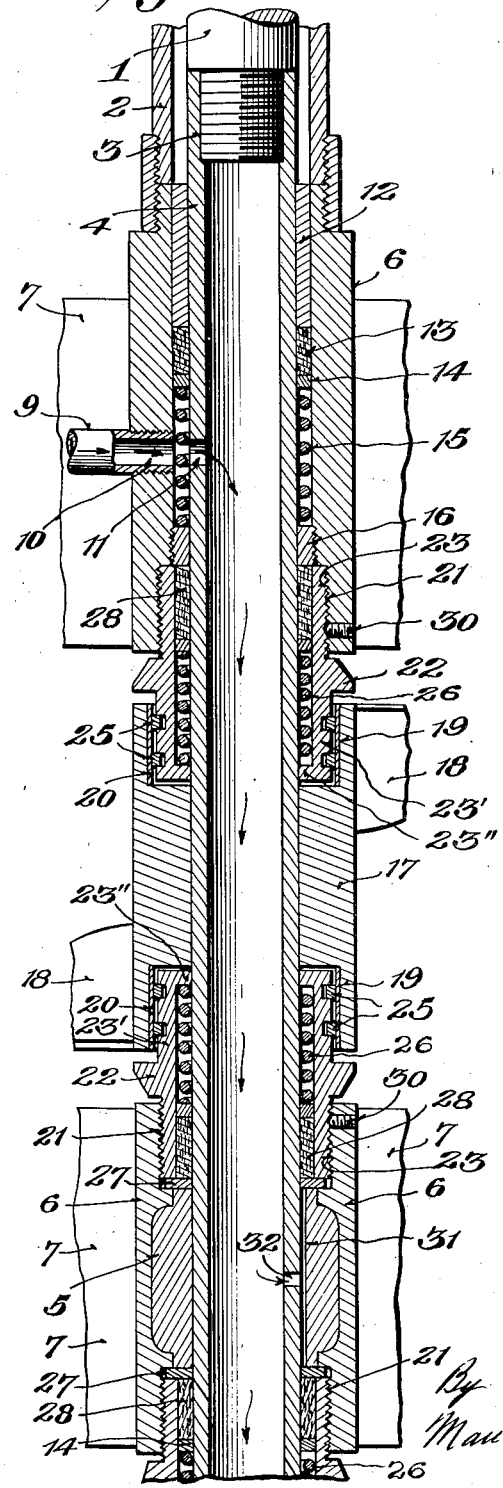
Fig. 4 is a vertical section with parts broken away showing the construction of the pump, with the exception of the lower end thereof.

Referring to the figures of the drawings, in which like reference numerals indicate like parts throughout the several views, 1 is a usual or any suitable shaft extending downward from the surface, and preferably is a solid shaft. Surrounding said shaft section 1 is a tube 2, whose diameter is such as to leave an annular space between the interior of said tube and the shaft section 1, into which annular space a lubricating oil of any desired quality may be introduced, preferably a light oil being used as is common in the art in lubricating turbine pump shafts. Coupled to the end of the shaft section 1 in any suitable manner, here shown at 3 as screw-threaded thereto, is a hollow shaft section 4, which extends down to the bottom of the pump, taking bearing in a series of bearings 5, preferably of bronze, each of which bearings is mounted in a bearing support 6 held centrally within sections of the well casing (technically known as impeller sections) by radial wings 7. Lubricant, preferably in the form of a heavy oil, is led from any suitable reservoir 8, Fig. 1, at the surface, through a pipe 9 downward within the upper bearing section, the lower end of the pipe passing through a port 10 to the interior of the upper support. The hollow shaft section 3 is provided with a port 11 delivering from the interior of said upper support into the hollow shaft, to the end that lubricant may be fed continuously through the port 11 to the interior of said hollow shaft section.

Referring now to the upper bearing 6, for said hollow shaft section, a bearing ring 12 is pressed into an annular recess cut in the upper end of the support 6 and serves to retain a washer 13 of felt or other suitable material, beneath which washer is preferably inserted a bronze washer 14. This bearing ring 12 serves to effectively close the lower end of the annular recess between the shaft 1 and the tube 2 so as to retain the light lubricating oil therein. Beneath the washer 14 and surrounding the hollow shaft section 4, opposite the port 11, is a coil spring 15, preferably of bronze, and a ring 16, also preferably of bronze, screwed into the support so as to compress said spring and force the bronze washer 14 tightly against the felt washer 13 and compress the same between said washer and the ring 12.

Impeller hubs 17, having suitable impeller blades 18, are secured in any suitable way to the hollow shaft section 4 between the respective bearings and revolve with said shaft section. Each impeller hub is provided at its upper and lower end with a circular recess 19, each of said recesses being preferably lined with a steel ring 20, see Fig. 4. Each of the bearing supports 6 is provided on both its upper and its lower portions with an interiorly threaded recess 21. The proportions of the impeller hubs are such, and they are so mounted on the hollow drive shaft section, that the hubs are spaced somewhat apart from the bearing supports, both above and below the same.

Referring now to Fig. 3, 22 is a packing nut screw-threaded at 23 so as to enter the screw-threaded recesses 21 in the respective bearing supports. This nut is hollow and has an extended portion 23' provided with an interiorly extending annular ledge 23". On the exterior of said extended portion 23' a plurality of annular recesses 24 are cut and within these recesses 24 are inserted split spring rings 25. The outer surfaces of these rings 25, when in position, project slightly from the outer surface of the nut portion 23' but are capable of being compressed within the recesses 24. Resting on the inwardly projecting annular ledge 23", is a coil spring 26, preferably of bronze, and on the upper end of said spring is a washer 27, also preferably of bronze, said washer serving to support a washer of felt or other suitable compressible material 28, the whole being so assembled that the spring 26 acts through the washer 27 to place the felt washer 28 under compression, said felt washer being preferably retained within the nut 28 by screws 29, and the felt washer projecting some distance beyond the screw-threaded end of the nut 22, all of which is clearly shown in Figs. 2 and 3.

The parts are assembled from the bottom up. The bottom sections 5, 6 are placed on the lower end of the shaft and the nut 22 screwed home compressing spring 15 and packing 28 see Fig. 5. The impeller hub 17 is secured on the shaft with the bottom recess therein receiving the projecting portion 23' of the nut, after which the next packing nut is placed on the shaft with its projecting portion 23 in the upper recess of the hub and the nut screwed into the bearing support next above, as will be readily understood from an inspection of Fig. 4.

Each of the bearings 5 is provided with a longitudinal groove 31, Fig. 4, and immediately opposite each bearing a port 32 is formed through the hollow drive shaft section, to the end that lubricant may be fed through said port 32 and into the groove 31, and as the shaft section revolves the lubricant will be carried to every part of the bearing.

The rings 25 fit snugly within the steel linings 20 of the recesses 19 in the impeller hubs 17, and it will be seen that, when the nuts 22 are in place, they serve to entirely enclose all that portion of the shaft between the impeller hubs and the bearing and to effectively exclude contact of water, sand or other exterior matter with the shaft section, and also to prevent the entrance of the same into the bearings as well as to prevent the escape of the lubricant from the bearings.

Figure 5:
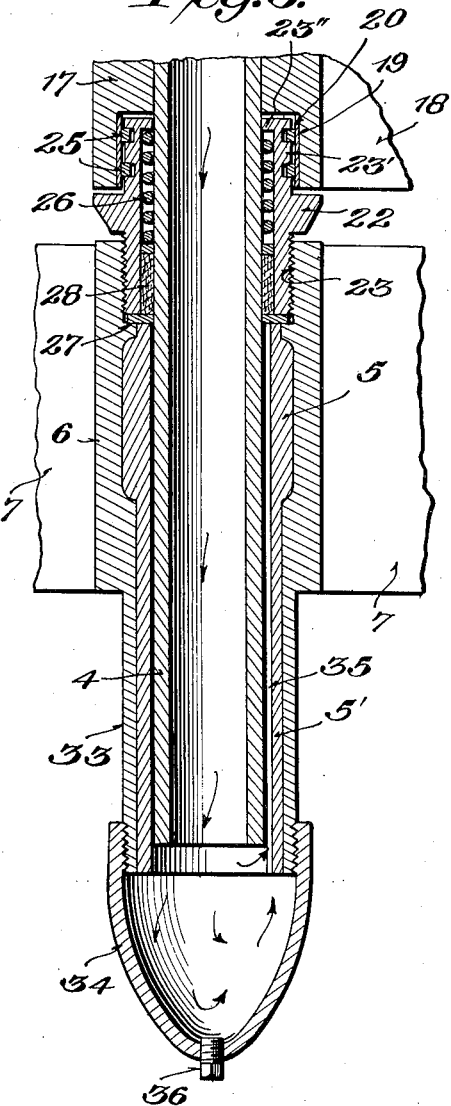
Fig. 5 is a vertical view with parts broken away of the lower end portion of the pump.

Referring now to Fig. 5, the bottom bearing support 6 has a downwardly extending portion 33 to which is secured, as by screw-threading or otherwise, a suitable closed chamber 34 into which the open lower end of the hollow drive shaft section directly opens. The lower bearing 5 has a downwardly extending portion 5', the two parts 5 and 5' constituting the complete bearing for the lower end of the hollow drive shaft, and within said bearing there is formed a groove 35 which at its lower end is in open communication with the chamber 34, which chamber is preferably closed at its lower portion as by a screw plug 36. It will be readily understood that lubricant is circulated as indicated by the arrows from the interior of the hollow drive shaft section into the chamber 34, and then passes upwardly into the groove 35 where it serves to lubricate the lower portion of the said drive shaft section.

The nut 22 is screwed into an interiorly screw-threaded ecess in the lower bearing support 6 tightly compressing the felt washer 28 against the tension of the spring 26, in precisely the same manner as was described in connection with Fig. 4.

It will be observed that the solid drive shaft section 1 is efficiently lubricated in the ordinary and well known way and that the lower hollow drive shaft section 4 is protected through its entire extent from contact with water, sand and other foreign material; that the lubricant is constantly supplied to every part of the bearings of said shaft section and is efficiently retained therein, so that there is no waste of the lubricant. The result is that the shaft is efficiently lubricated with a minimum amount of lubricant and is effectively protected against the entrance of foreign matter into the bearings which would rapidly deteriorate the same and render repairs and replacements necessary, and that the pump is practically free from injurious vibration.

While the improved pump has, in the interest of clearness, been described in considerable detail, it will be readily understood by those skilled in the art that these details may be varied within the limits of the appended claims and that some of the parts may be omitted without modifying the essential method of operation of the device as a whole, and such variations and omissions as are within the limits of the appended claims are intended to be covered thereby.

What is claimed is:

1. In a turbine pump, the combination of a solid shaft section, means for lubricating the same, a hollow shaft section coupled to the lower end of said solid section, means for delivering a lubricant within said hollow section, a series of bearings for said hollow section, ports leading from the interior of said hollow section to said bearings, an impeller carried by the hollow section between said bearings, and a spring pressed compressible washer on said hollow section above and below each of said bearings.

2. In a turbine pump, the combination of a solid shaft section and a hollow shaft section coupled thereto, with bearings for said hollow shaft section, means for delivering a lubricant to the interior of said hollow section, ports leading from the interior of said hollow section to said bearings, an impeller secured to said hollow section between said bearings, and a spring pressed compressible washer on said hollow section above and below each of said bearings.

3. In a turbine pump, the combination of a hollow driving shaft-section and means for delivering a lubricant thereinto, with a series of bearings for said shaft section, said section having a port leading from the interior thereof to each of said bearings, a support for each of said bearings, a compressible washer surrounding said hollow section above and below each bearing, a spring surrounding said section adjacent each washer, and a nut screwed to each support above and below each bearing and pressing said spring towards the said felt washers.

4. In a turbine pump, the combination of a hollow driving shaft-section, bearings and bearing supports therefor, with means for lubricating said bearings from the interior of said shaft-section, impellers secured to said shaft-section between said bearings and having hubs recessed on each side, compressible washers surrounding said shaft-section on each side of said bearings, a spring reacting on each washer, and a nut screw-threaded into the bearing supports and compressing each spring, said nuts having a portion extending into the recesses of the impeller hubs.

5. In a turbine pump, the combination of a hollow driving shaft-section, bearings and bearing supports therefor, with means for lubricating said bearings from the interior of said shaft-section, impellers secured to said shaft-section between said bearings and having hubs recessed on each side, compressible washers surrounding said shaft-section on each side of said bearings, a spring reacting on each washer, and a nut screw-threaded into the bearing supports and compressing each spring, an extended portion of said nuts having circumferential grooves formed thereon, and split rings in said grooves, said extended nut portions entering the recesses in the impeller hubs with the split rings bearing on the interior faces of said recesses.

6. In a turbine pump, the combination of a hollow shaft-section, an exterior bottom bearing therefor, a support for said bearing, means delivering a lubricant to the interior of said shaft-section, a lubricant chamber carried by said support and in open communication with the bottom of said shaft-section and the interior of said bearing, a packing surrounding said shaft section at the top of said bearing, a spring bearing on said packing, and a nut screw-threaded into said support and placing said spring under tension.

7. In a turbine pump, the combination of a hollow shaft-section, an exterior bottom bearing therefor, a support for said bearing, means delivering a lubricant to the interior of said shaft-section and thence to the interior of said bearing, a felt washer surrounding said shaft-section above said bearing, a spring surrounding said shaft-section and pressing on said washer, and a nut screwed into said support and compressing said spring.

8. In a turbine pump, the combination of a solid shaft-section and means for lubricating the same, with a hollow shaft-section secured to said solid shaft-section, a plurality of bearings for said hollow shaft-section, supports for said bearings, means supplying a lubricant to the interior of said hollow shaft-section and therefrom to said bearings, impellers secured on said hollow section between said bearings, and shaft-enclosing packing glands carried by said supports at the points where the shaft enters said bearing and extending from said bearings to the impeller hubs.

9. In a turbine pump, the combination of a solid shaft-section and a hollow shaft-section coupled thereto, with a bearing support, a bearing ring in said support and in which said hollow section takes bearing, a tube surrounding said solid section with an annular lubricating space between said tube and said solid section, a felt washer surrounding said hollow section adjacent said bearing ring, a coiled spring compressing said washer, a ring below said spring and acting to compress the same, a spring pressed felt washer below said ring, and means delivering a lubricant between the coils of said first named spring.

10. In a turbine pump, the combination of a shaft, bearing supports and bearings, with impellers secured to said shaft and having circular recesses in the upper and lower faces of each of their hubs, tubular packing members surrounding said shaft and secured to and packing the joints at said bearing supports and extending into said recesses, and tension means closing the joint between the interior face of said recesses and the exterior of said tubular member.

11. In a turbine pump, the combination of a shaft and its bearings, with impellers having recesses in the upper and lower faces of their hubs secured to said shaft, and tubular packing glands surrounding said shaft and packing the joints at the bearings and having extensions entering the recesses in the impeller hubs, and means closing the joints between the exterior faces of said extensions and the interior faces of said hub recesses.

12. In a turbine pump, the combination of a solid shaft section and a hollow shaft section coupled together, a bearing support, a bearing ring in said support, means supplying lubricant around said solid shaft section above said ring, a spring-pressed packing gland surrounding the shaft beneath said ring, a second ring carried by said support, a spring-pressed packing gland surrounding said shaft beneath said second ring, a second lubricant supplying means delivering lubricant to the space around said hollow shaft section between said rings, and a port leading from said space to the interior of the hollow shaft.

13. In a turbine pump, the combination of a hollow driving shaft with two bearings therefor, supports for said bearings, means for lubricating said bearings from the interior of said shaft, and an impeller secured to said shaft between said bearings, the hub of said impeller being recessed at its top and bottom, and two packing glands mounted one in each bearing support around said shaft, each gland having an extension surrounding said shaft and entering the adjacent recess in said impeller hub.

In testimony whereof I have signed this specification.

JULIEN B. CHOCKLEY.